United States Patent
Begg et al.

[11] 3,793,730
[45] Feb. 26, 1974

[54] LOCK SPRING PIN APPLIANCE

[75] Inventors: Percy R. Begg, Adelaide, Australia; Peter C. Kesling, La Porte, Ind.

[73] Assignee: TP Laboratories, Inc., LaPorte, Ind.

[22] Filed: May 5, 1972

[21] Appl. No.: 250,590

Related U.S. Application Data

[63] Continuation-in-part of Ser. No. 218,910, Jan. 19, 1972, abandoned.

[52] U.S. Cl. ............................................. 32/14 A
[51] Int. Cl. .............................................. A61c 7/00
[58] Field of Search ................................... 32/14 A

[56] References Cited
UNITED STATES PATENTS

| | | | |
|---|---|---|---|
| 3,093,903 | 6/1963 | Kesling | 32/14 A |
| 3,262,207 | 7/1966 | Kesling | 32/14 A |
| 3,641,672 | 2/1972 | Kesling | 32/14 A |
| 3,633,277 | 1/1972 | Reichel | 32/14 A |
| 3,408,739 | 11/1968 | Johnson | 32/14 A |
| 3,374,542 | 3/1968 | Moylan, Jr. | 32/14 A |

Primary Examiner—Louis G. Mancene
Assistant Examiner—J. Q. Lever
Attorney, Agent, or Firm—Lockwood, Dewey, Zickert & Alex

[57] ABSTRACT

An orthodontic appliance for use with a bracket having a pin opening and an arch wire slot, which comprises an uprighting spring and a pin coacting to lock one or more arch wires to the bracket and to apply an uprighting force to the tooth on which the bracket is mounted. The appliance includes a pin having a head, which coacts with the coil of the uprighting spring wherein the tail of the pin and the tail of the spring are received in the pin opening and the arch wire slot is closed such that free tipping between the arch wire and bracket is possible. The lever arm of the spring terminates in a hook for engaging with the arch wire and the coil of the spring is positioned at the bracket.

28 Claims, 18 Drawing Figures

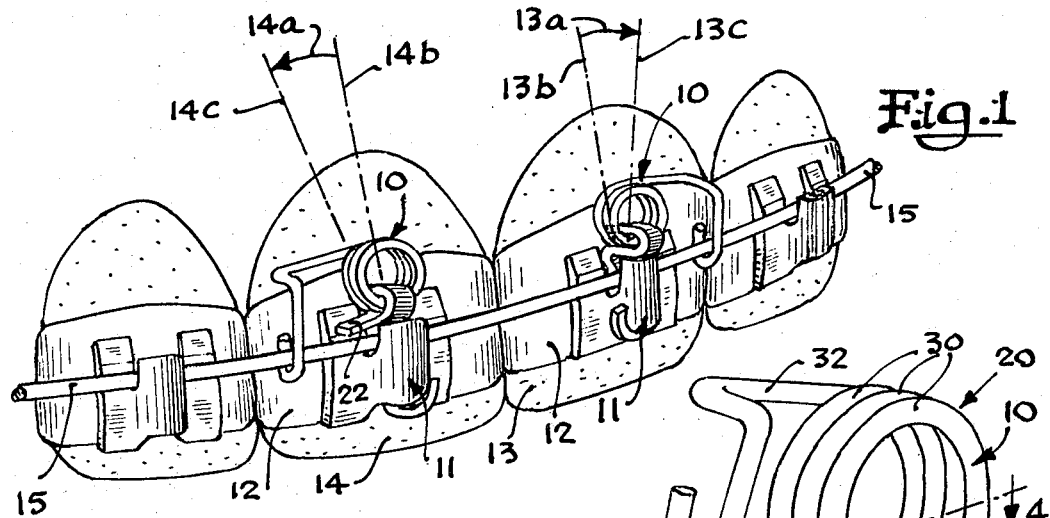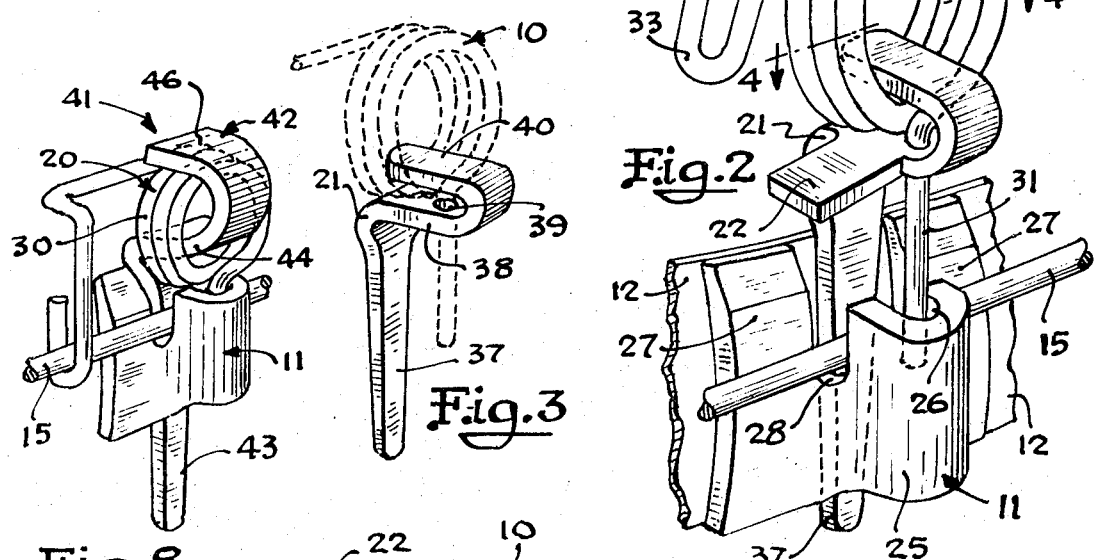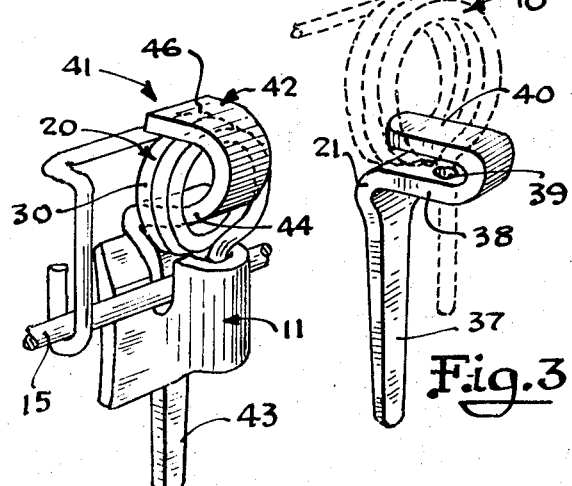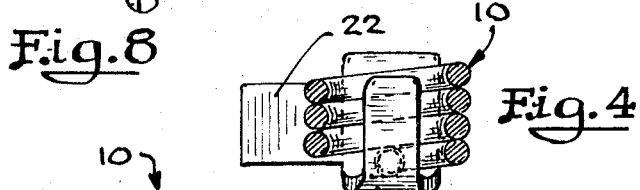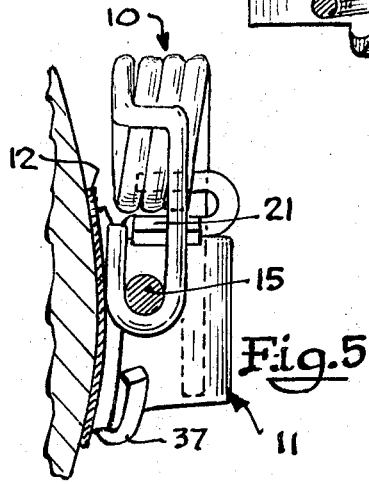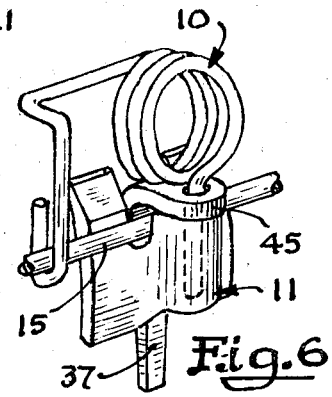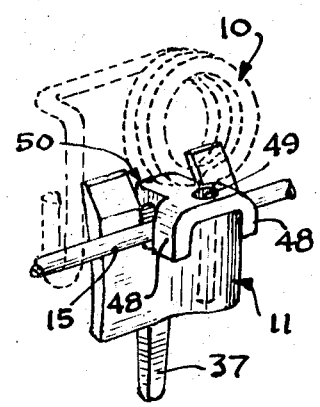

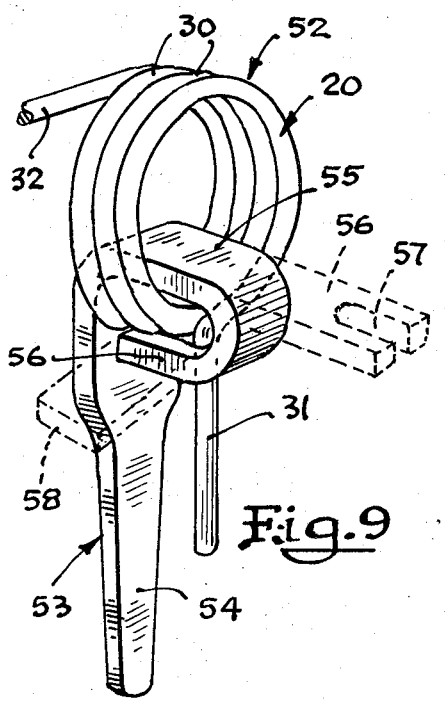
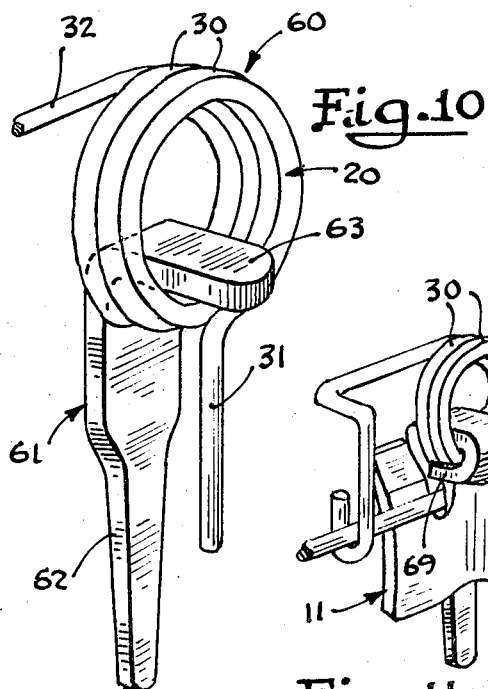
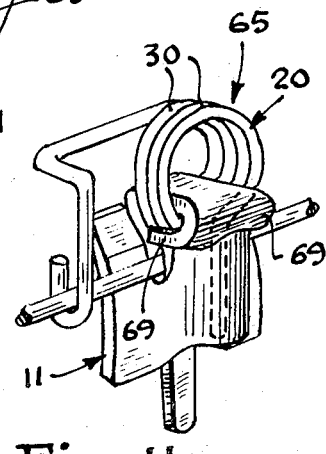
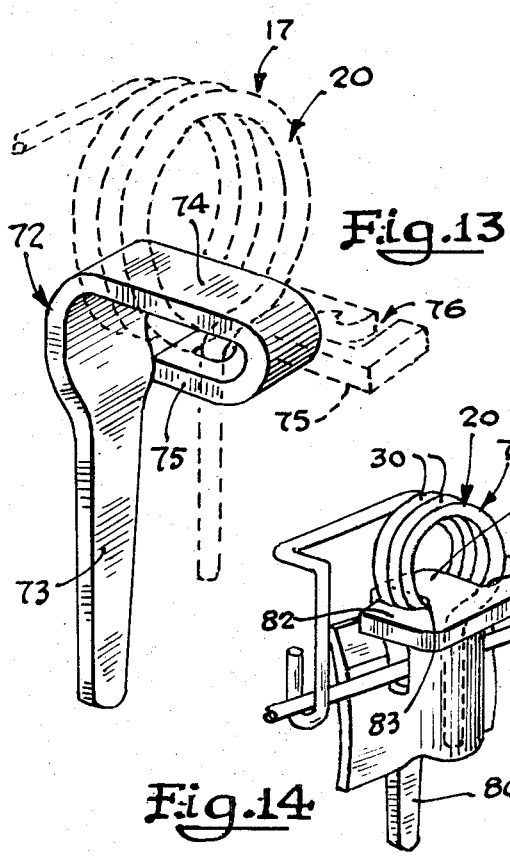
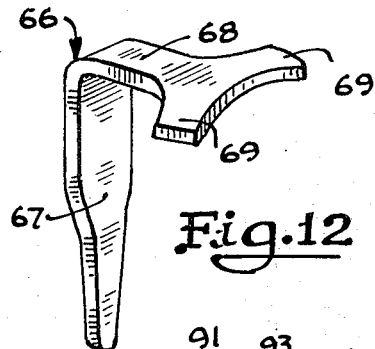
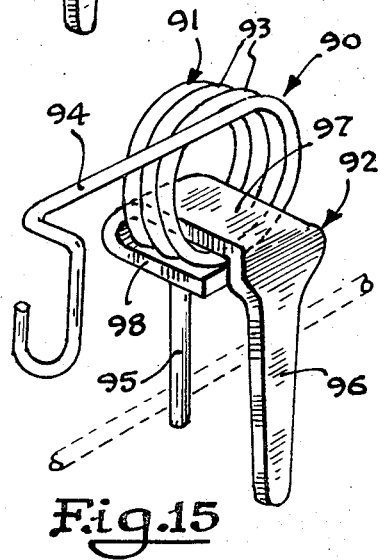

LOCK SPRING PIN APPLIANCE

This application is a continuation-in-part application of our copending application Ser. No. 218,910 filed on Jan. 19, 1972 now abandoned.

This invention relates in general to an orthodontic appliance and more particularly to a lock spring pin appliance for use with brackets having a pin opening and arch wire slot to lock one or more arch wires in the arch wire slot of the bracket and to apply an uprighting force to the tooth on which the bracket is mounted.

Uprighting springs are utilized in the third stage of the light wire technique for uprighting teeth, and normally include one end anchored at the bracket and the other end connected mesially or distally to the arch wire so that a relative force can be applied between the arch wire and the bracket to perform the uprighting function. It has been heretofore necessary to ligate one or more arch wires in the arch wire slot on the bracket when using an uprighting spring. While here the appliance of the invention will be illustrated as applied to a light wire bracket, it should be appreciated it can be used in brackets employed in other techniques.

It has also been heretofore necessary for the orthodontist to closely watch the movement of teeth under the action of uprighting springs, to prevent the teeth from being "over-moved." This has required additional visits on the part of the patient, and if for some reason a spring was not removed in time, the root of the tooth will strike the root of an adjacent tooth or occupy a position in the bone preventing the adjacent tooth from assuming its proper position.

It has been heretofore proposed to make a one-piece uprighting spring and a lock pin appliance, such as shown in U.S. Pat. No. 3,408,739, but such an arrangement has not been successful because it is not possible to make the appliance having the many sharp bends necessary to accomplish the pin function. It is difficult to bend spring steel wire as illustrated in this patent. Furthermore, the coils are necessarily held at such a great distance from the arch wire, the point of rotation of the tooth, that the device is inefficient and subject to deformation from the mere force of application and from the forces of mastication. The proposed appliance of this patent is also objectionable in that it seats the arch wire at the bottom of the arch wire slot in the bracket which inhibits tipping except in uniquely formed brackets such as those disclosed in the patent. Moreover, extreme flexing of the device may allow the arch wire to escape the bracket slot, and it is difficult to bend the tail of the spring over the end of the bracket unless it is first annealed or softened.

The lock spring pin appliance of the present invention is primarily intended for use with the standard light wire brackets, such as those illustrated in U.S. Pats. Nos. 3,085,336 and 3,178,821, but it may be used with other light wire brackets, universal brackets vertically slotted edgewise brackets, or any bracket having an occlusogingivally extending opening to coact with means for attaching an arch wire thereto. The appliance includes a pin made of easily bendable soft metal, preferably dead soft metal, such as brass or the like, and an uprighting spring made of spring steel wire, both of which include tails that straddle the arch wire or wires when locking same in the arch wire slot of a bracket. One or both of the tails may be of such length that when the appliance is seated on a bracket, the tail or tails will extend through the opening means or pin opening and be bendable back on the bracket to lock the appliance in place. Likewise, one of the tails may be short and may only extend along one side of the arch wire.

The pin in one form includes a stem or tail that extends through the pin opening of a bracket along one side of the arch wire, and a head bottoming on the end of the bracket at the arch wire slot closing the slot to lock the arch wire to the bracket. The term "pin opening" as used herein generally refers to the occlusogingivally extending opening in the body of a bracket normally designed to receive at least the tail of a lock pin, but also includes where applicable the space between the welding flanges. The tail of the pin is bent over the incisal or occlusal end of the bracket to secure the pin to the bracket. A hole is provided in the head of the pin for receiving the tail of the spring to interconnect the pin and spring. The spring tail also extends into the pin opening of the bracket so that one end of the spring is held by the bracket. The coil or coils of the uprighting spring bottoms on the gingival side of the pin head and a lever arm extends from the coil for engagement with the arch wire. The coil of the uprighting spring may be locked to the pin by providing a locking extension or tab on the head of the pin that is bent through the center of the coil to hold it against the head of the pin, thereby presenting an assembly prior to mounting the appliance on a bracket. Lateral extensions from the pin head may be provided to strike the arch wire when the tooth has assumed the desired angulation. This prevents the tooth from being "ore-moved" which may cause it to interfere with the positions of adjacent teeth.

Accordingly, it is an object of the present invention to provide an orthodontic appliance for use with a bracket having an occlusogingival opening, wherein the appliance is capable of locking one or more arch wires to the bracket and of applying an uprighting force relative the arch wire, thereby eliminating the need to ligate the arch wire to the bracket while providing freedom for uprighting.

Another object of this invention is in the provision of a lock spring pin appliance for use with a bracket having an occlusogingival opening which includes an uprighting spring and pin coacting to lock the arch wire to the bracket and apply an uprighting force to the bracket, and a tail extending through the opening to be bent around the bracket and lock the appliance in place.

A further object of this invention is to provide a lock spring pin appliance where the pin is made of relatively soft metal capable of easily being bent to lock the appliance to a bracket, the uprighting spring is made of spring steel wire, and wherein the appliance may be quickly and easily installed in place on a bracket.

A still further object of this invention is in the provision of a lock spring pin appliance capable of locking one or more arch wires to a bracket and which will not bind on the arch wire(s) to allow relative tipping movement between the bracket and the arch wire.

Another object of this invention is in the provision of a lock spring pin appliance wherein the uprighting spring may be removed following the uprighting action without removing the pin, thereby maintaining the arch wire locked in place on the bracket.

Another object of this invention is to provide a lock spring pin appliance that will be self-limiting and "deactivate" itself when the tooth has reached the proper inclination.

Another object of this invention is in the provision of a lock spring pin appliance where the pin is made of relatively stiff, hard-to-bend material and the tail of the uprighting pin is soft enough to permit ease of bending around the incisal or occlusal end of the bracket to lock the appliance in place.

Other objects, features and advantages of the invention will be apparent from the following detailed disclosure, taken in conjunction with the accompanying sheets of drawings, wherein like reference numerals refer to like parts, in which:

FIG. 1 is a fragmentary perspective view of the upper arch showing light wire brackets on certain teeth and the lock spring pin appliance of the invention mounted on two of the brackets and illustrating the application of uprighting forces in both directions, and showing one appliance with a limiting lateral extension;

FIG. 2 is an enlarged perspective view of a light wire bracket and the lock spring pin appliance of the invention in somewhat exploded view with respect to the bracket to illustrate how the appliance is inserted;

FIG. 3 is a perspective view of the appliance without the lateral limiting extension illustrating especially the pin with the uprighting spring in phantom;

FIG. 4 is a detailed sectional view taken substantially along line 4—4 of FIG. 2;

FIG. 5 is a side elevational view illustrating the appliance of the invention mounted in place on a bracket;

FIG. 6 is a perspective view of a modification wherein the pin does not include means for locking the spring to the pin;

FIG. 7 is a perspective view of a modification with incisal extensions to more securely lock the arch wire in place and to prevent undesired rotations between the arch wire, bracket and the appliance;

FIG. 8 is a perspective view of a modification of the invention wherein the head of the pin extends through the spring coils and a locking tab is bent back from the head over the upper end of the coils;

FIG. 9 is a perspective view of a further embodiment of the invention, and illustrating in phantom the locking tab shape;

FIG. 10 is a perspective view of a further modification which differs from the embodiment of FIG. 9 only in that no locking tab is provided to lock the spring and pin together as a unit;

FIG. 11 is a perspective view of a still further embodiment of the invention shown mounted in a bracket;

FIG. 12 is a perspective view of the pin of the combination shown in FIG. 11 removed from the spring and with the locking tabs open prior to being bent over the spring coils;

FIG. 13 is a perspective view of a still further embodiment of the invention showing the locking tap shape in phantom;

FIG. 14 is a perspective view of a still further embodiment of the invention and shown in association with a bracket;

FIG. 15 is a still further embodiment of the invention which is essentially the same as FIG. 9 with the parts in reversed position;

Figure 16:
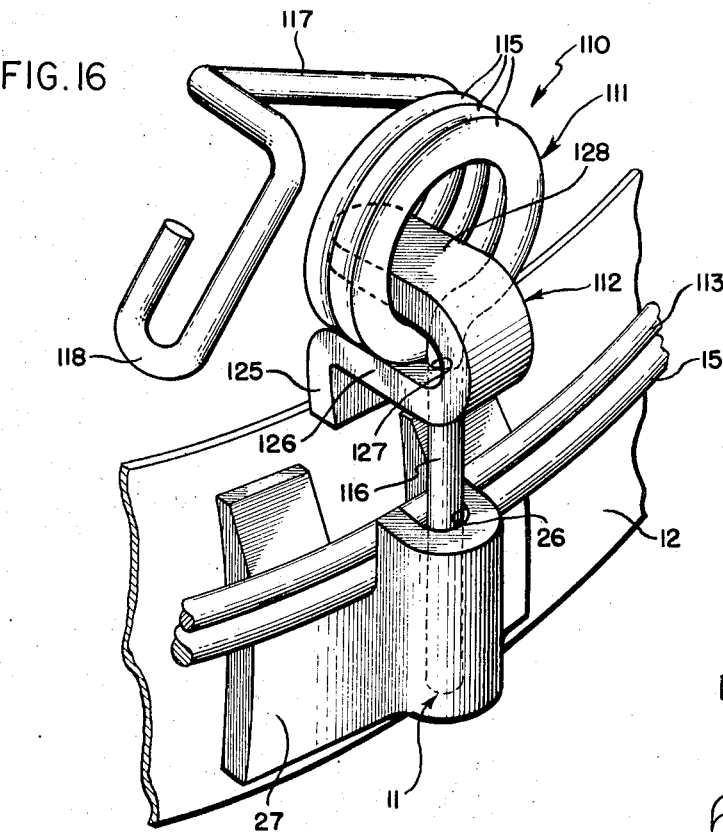

FIG. 16 is a perspective view of another modification of the invention shown in association with a bracket and slightly removed from the bracket to illustrate how it is inserted, wherein the tail of the pin extends between the welding flanges and is shortened to the extent that it only reaches about the depth of the arch wire slot when the appliance is inserted on a bracket, and where the tail of the uprighting spring is bent over the bracket to lock the appliance in place.

Figure 18:
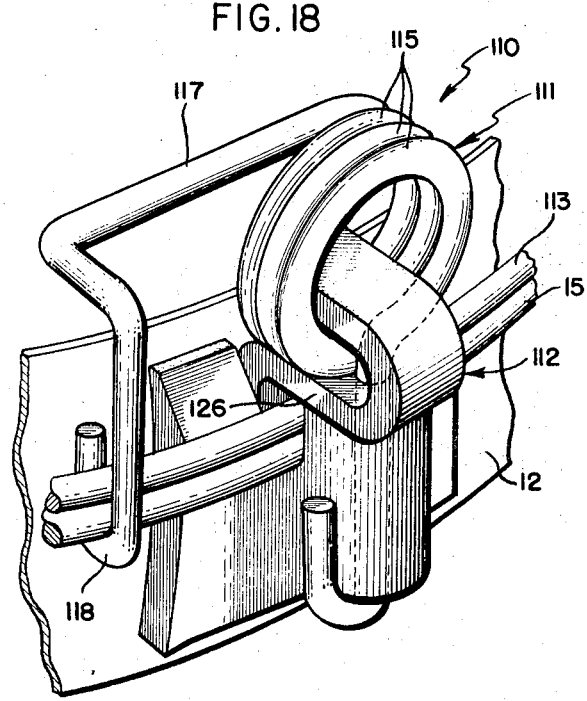
Figure 17:
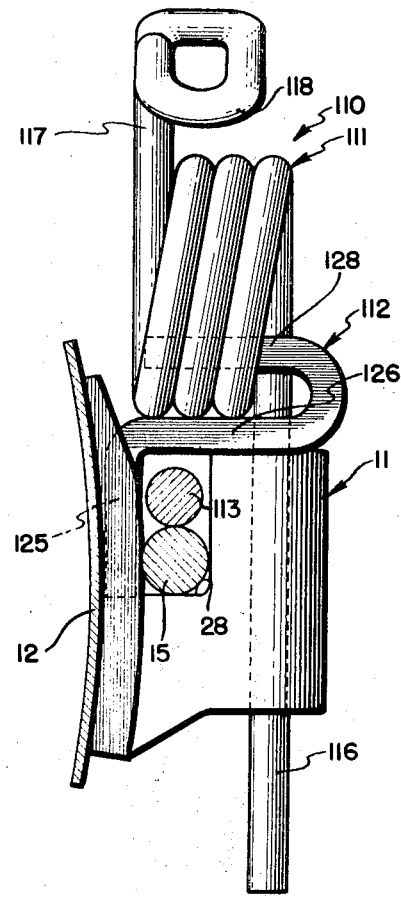

FIG. 17 is a side elevation view of the bracket and appliance of FIG. 16 showing the appliance seated on the bracket and the relationship with the arch wires and prior to the hooking of the spring lever arm to the arch wires; and FIG. 18 is a perspective view of the embodiment of FIG. 16 showing the appliance in completely mounted position on a bracket having arch wires in place.

The lock spring pin appliance of the invention is especially useful with a standard light wire bracket such as the TP 256 bracket made by TP Laboratories, Inc. of LaPorte, Indiana, although it should be appreciated that the appliance could be used with other light wire brackets, or most any bracket having an opening means or pin opening. The appliance is used during the third stage of the light wire technique, at which time it is desired to upright teeth that are essentially non-vertical or not at the preferred axial relationship to the arch. At this stage it is necessary to lock one or more arch wires in place to the bracket such as in the arch wire slot of the bracket in such a manner to permit relative tipping action between the bracket and arch wire.

The appliance of the invention includes an uprighting spring and a pin where the spring and pin may be presented individually, or fastened together. Preferably, the pin and spring are fastened together so that only a single unit is handled when installing the appliance. The pin includes a stem or tail that will extend through the pin opening of the bracket lingually or labially of the arch wire. A head is formed on the gingival end of the tail to overlie and close the arch wire slot. Accordingly, the pin head does not enter the pin opening of the bracket, and therefore functions to allow relative tipping movement between the bracket and arch wire. The tail of the pin or spring is bend around the occlusal end of the bracket to lock it in place.

The uprighting spring includes a coil or a plurality of coils which seat on the gingival side of the pin head or the bracket, and a tail extending into the opening means or pin opening at the labial or lingual side of the arch wire or wires. A tail in one form of the invention extends from one end of the coils through a hole formed in the pin head and onto the pin opening of the bracket on the buccal or labial side of the arch wire. A lever arm extends from the other end of the coils and is provided with a hook for hooking to the arch wire at the mesial or distal side of the bracket. Preferably, a locking tab extends from the buccal or labial end of the pin head and is bent back through the center of the coils to lock the coils to the pin head thereby presenting a lock spring pin appliance.

Referring now to the drawings and particularly to FIG. 1, a plurality of teeth of an upper arch are illustrated with the appliance of the invention mounted in place. The lock spring pin appliance 10 is illustrated in FIG. 1 mounted on brackets 11 which are in turn suitably fastened, such as by welding or soldering to bands 12. The bands are suitably cemented to the teeth 13 and 14. An arch wire 15 is shown locked to the brackets 11 by the spring pin units 10 wherein the forces applied by the arch wire and the brackets are such as to cause uprighting of the teeth 13 and 14 in the direction of the arrows 13a and 14a from the actual or present axes 13b and 14b to the preferred axes 13c and 14c. The limiting extension 22 on tooth 14 can be used to prevent further movement of the axis beyond the 14c position. The spring pin appliance on tooth 13 does not have this modification. Thus, when the arch wire engages the extension 22, further tipping will cease and the spring will be deactivated. The extension therefore assures proper inclination and prevents overtipping. It will be appreciated that uprighting in the opposite direction would be accomplished by reversing the position of the lever arm and the wind of the coils of the uprighting spring relative to the bracket.

The lock spring pin appliance 10 includes an uprighting spring 20 made of a suitable spring steel wire and a pin 21 made of a suitable soft, easily bendable, substantially dead soft metal, such as brass. This spring pin unit for use in the third stage of the light wire technique is especially useful for mounting on light wire brackets, such as the type illustrated or other commercially available light wire brackets, but it should be appreciated that it could be mounted on edgewise brackets having an occlusogingival extending pin opening, and an arch wire slot.

The light wire bracket 11 illustrated here includes a U-shaped body 25 defining an occlusogingivally extending pin opening 26, and mesially and distally extending welding flanges 27 which facilitate attachment of the bracket to the band 12. Either welding or soldering techniques may be used to fasten the bracket to the band and here it is appreciated that the bracket is made of metal. It should also be appreciated that the bracket may be made of plastic wherein the flanges would then be directly cemented to a tooth. The spring pin unit 10 can be used with either metal or plastic brackets. A mesiodistally extending arch wire slot 28 is formed in the bracket body at the gingival end of the bracket so that it opens gingivally and has a labiolingual depth extending from the welding flanges less than the labiolingual depth of the body. The occlusogingival depth of the arch wire slot 28 is usually about twice the diameter of the arch wire used although it may be of any suitable depth. Where the bracket is mounted onto a band, such as illustrated, the pin opening extends clear to the band between the welding flanges 27.

The uprighting spring 20 of the spring pin unit 10 includes a plurality of connected coils 30, one end of which is integral with a tail 31 and the other end of which is integral with a lever arm 32. The outer end of the lever arm is bent to form a hook 33 to facilitate hooking onto the arch wire 15. While three coils 30 are illustrated, it should be appreciated that any number of coils may be provided. Further, the structure of the uprighting spring as illustrated is well known.

It should be further appreciated that the uprighting spring 20, which is of a standard configuration, is made of spring steel wire which is difficult to bend too sharply. For example, it has been heretofore proposed to bend the tail of an uprighting spring around the end of a bracket which is possible but difficult to accomplish because of the sharp bend required. Preferably the tail is first annealed or softened which permits it to be easily bent around the end of a bracket. The tail 31 of the spring 20 in this embodiment is preferably of such a length that it will not extend beyond the occlusal end of the bracket when it is in place, such as illustrated in FIG. 5.

The pin 21 includes a stem or tail 37 adapted to be insertable in the pin opening 26 of the bracket and a head 38 at one end which extends substantially perpendicular to the tail. Preferably, the head 38 is slightly wider mesiodistally than the tail and includes a hole 39 through which the spring tail 31 is inserted when the spring is assembled with the pin. A locking tab 40 extends from the head and is bent back over the head and into the center of the spring coils 30, as illustrated in the drawings, to lock the spring and pin together as a unit. The length of the locking tab is limited by the size of the spring coils so that the tip end of the locking tab will clear the coils when it is bent inwardly in final assembled position.

Mounting the spring pin unit 10 requires a simple procedure wherein following the positioning of the arch wire 15 and/or other arch wires in the slot 28 of the bracket 11, the unit 10 may be held by a pair of pliers to orient it for insertion into the bracket where the pin tail 37 inserts lingually of the arch wire 15 into the pin opening 26 and the spring tail 31 inserts labially of the arch wire 15 into the pin opening 26 wherein the tails of the appliance straddle the arch wire. When the pin head 38 is seated on the gingival end of the bracket body 25, the tip end of the pin tail 37 may than be bent over and around the occlusal end of the bracket body to a position such as illustrated in FIGS. 1 and 5, thereby locking the spring pin unit in place. At this point the lever arm and hook of the spring will be relaxed and positioned above the arch wire. Thereafter the lever arm 32 and hook 33 of the spring are tensioned and displaced to be connected to the arch wire 15, such as illustrated in FIGS. 1 and 5 completing the installation. Should it thereafter be desired to remove the uprighting spring after it has accomplished its mission of uprighting the tooth, it is a simple matter to bend out the locking tab 40 so that the spring can be removed. Thereafter the locking tab may be bent back in place, keeping the pin in location for continued locking of the arch wire or wires to the bracket. Thus, it is not necessary to remove the pin when the uprighting action has been accomplished.

Because the arch wire is trapped between the pin tail and the spring tail when the spring pin unit is in position on the bracket, it is not possible for the arch wire to escape during the flexing of the coils of the uprighting spring. Further, it can be appreciated that there is no need to ligate the arch wire or wires to the bracket since the pin positively locks the arch wire in place.

A modification is illustrated in FIG. 6 wherein it differs from the preferred embodiment of FIGS. 1-5 in that the pin 45 does not include a locking tab for locking the spring to the pin. Accordingly, the pin is first inserted as one part and then the spring is inserted as a second part. Quite obviously, this embodiment is not as easy to use as that shown in FIGS. 1-5, and it is possible that the spring may come out during the treatment if the tail is not bent over the occlusal end of the bracket. It should be appreciated that bending the spring steel material of the spring is quite difficult compared to bending the soft metal of the pin.

The embodiment of FIG. 7 differs from the embodiment of FIG. 6 in that incisal extensions 48 are provided on the head 49 of the pin 50. When the appliance is in mounted position the extensions 48 function to more securely lock the arch wire in position and the uprighting spring in position in that undesired relative rotations between the bracket and pin are eliminated as the extensions 48 engaging the mesial and distal ends of the bracket body prevent the mesial and distal movement of the pin head relative to the bracket body.

Another form of the invention is illustrated in FIG. 8 wherein the appliance is generally designated by the numeral 41 and includes an uprighting spring 20 and a pin 42. The uprighting spring is identical to that in the previous embodiments while the pin includes a tail 43, a head 44 extending at right angles to and through the center of the coils 30 of the uprighting spring and a locking tab 46 that is bent over the top side of the coils. Accordingly, the pin head coacts with the coils to close the arch wire slot of the bracket while the locking tab 46 fastens the spring and pin together as a unit prior to it being mounted on a bracket.

The embodiment of FIG. 9 shows an appliance 52 according to the invention which includes an uprighting spring 20 and a pin 53. The uprighting spring 20 is identical to the spring illustrated in the other embodiments and therefore the same numerals are applied to the same elements. The pin 53 includes a tail 54 and a head 55 at the upper end and which extends substantially perpendicular to the tail, and a locking tab 56 which extends from the head and is bent back under the coils 30 of the uprighting spring. The locking tab 56 is bifurcated at its free end or slotted at 57 to accommodate the spring tail 31. Assembly of the pin and spring is accomplished by first having the locking tab bent into proper position with the head and with the tail of the pin extending in the same plane as the pinhead so that the head and locking tab can be slipped onto the spring. When it is in seated position, the tail can then be bent downwardly at right angles to the head to provide the structure as shown in FIG. 9. The locking tab 56 is shown in phantom for purposes of illustrating the structure at the end of the tab where it is bifurcated. Also illustrated in phantom is a limiting extension 58 which could extend laterally from one side of the locking tab 56 to engage the arch wire following a predetermined tipping action of the appliance to thereafter stop further tipping movement. This would enable inclination control and prevent overtipping of a tooth, as in the embodiment of FIG. 2.

The embodiment of FIG. 10, generally designated by the numeral 60, includes the uprighting spring 20 and a pin 61 which differs from the embodiment of FIG. 9 only in that the pin is not fastened to the spring to form a singular unit prior to insertion of the appliance into a bracket. The pin includes a tail 62 and a head 63 which extends through the center of the spring coils 30 to lock the spring in place on the bracket when the appliance is mounted on the bracket. Following uprighting treatment of a tooth, the appliance 60 may be removed and the spring can be easily separated from the pin so that the pin may be used again without the spring for the sole purpose of locking an arch wire in the arch wire slot of a bracket. When the appliance is mounted on a bracket, the coils of the spring seat against the upper end of the bracket. As in the other embodiments, both the spring and pin tails extend through the pin opening to straddle the wire and the pin tail is bent around the body of the bracket to lock the appliance in place.

Another form of appliance is shown in FIGS. 11 and 12 which differs from the embodiment of FIG. 9 only in the form of a pin, it being appreciated that the uprighting spring is the same as used in the other appliances illustrated. This embodiment is generally designated by the numeral 65 and the pin 66 includes a tail 67 and a head 68. Extending from the head are a pair of spaced locking tabs 69 which are bent over the coils 30 of the uprighting spring as seen in FIG. 11. Since the locking tabs 69 are spaced apart and they are shown in FIG. 12 prior to being bent around the coils of the spring, they define an open area of the spring which seats against the bracket when the appliance is mounted in the bracket and wherein the locking tabs straddle the bracket body. Accordingly, the coils of the uprighting spring can be brought in closer to the bracket body than is possible with the embodiments of FIGS. 2, 3 and 9. Otherwise the appliance of this embodiment functions in the same manner as the embodiments of FIGS. 2, 3 and 9. It should be further appreciated that limiting extensions could be provided on the locking tabs 69 to coact with the arch wire in controlling the inclination as obtained by the uprighting spring.

Another form of appliance is shown in FIG. 13 and is designated generally by the numeral 71 and which differs only in the form of a pin provided in that the pin includes a variation in the shape of the locking tab for fastening the pin to the uprighting spring 20. The pin is generally designated by the numeral 72 and includes a tail 73, a head 74 and a locking tab 75. For ppurposes of illustrating the construction of the locking tab 75, it is illustrated in phantom in a straightened position relative to the pin head 74, wherein it is seen that a slot 76 is formed in the locking tab 75 to receive the spring tail. The slot is right-angular in form wherein the tail of the spring is essentially locked to the tab 75 when the tab is bent into position around the spring coils. This embodiment is similar to the embodiment of FIG. 9 but differs only in the manner in which the slot is formed in the locking tab to accommodate the spring tail.

In FIG. 14 another form of appliance is illustrated and generally designated by the numeral 78 and which includes an uprighting spring 20 and a pin 79. Again, the uprighting spring 20 is identical to that used in the other appliances and the pin here illustrated coacts with the spring coils to fasten the pin and spring together as a unit prior to its being mounted on a bracket. The pin 79 includes a tail 80 having a head 81 at its upper end and extending at right angles thereto. Locking tabs 82 extend from the pin head 81 in the same plane as the pin head to define with the pin head slots 83 that accommodate the coils 30 as shown. Preferably, the spacing between the slots 83 which extend parallel to each other and parallel to the longitudinal axis of the head are spaced apart a distance less than the diameter of the coils so that the pin will provide a positive connection between the spring and pin when it is in position. The assembly of such a unit would be such that when the spring is by itself, the pin could be in flat form where the head and tail are in the same plane and the tail of the pin inserted into the center of the spring coils until the coils seat on the bottoms of the slots 83 and thereafter the tail 80 can be bent at right angle to the head 81 to lock the pin and spring together. This embodiment operates in the same fashion as the other embodiments in that when mounted in position it locks the arch wire in the arch wire slot in such a way to prevent relative tipping between the arch wire and bracket and force is applied between the arch wire and bracket to effect a tipping action on the tooth to which the bracket is mounted.

The embodiment of FIG. 15 differs from the embodiment of FIG. 9 only in that the spring tail and the pin tail are in opposite positions in the bracket. The appliance in this embodiment is generally designated by the numeral 90 and includes an uprighting spring 91 and a pin 92. The uprighting spring 91 is the same as the uprighting spring 20 with the exception that the lever arm and the tail are in reverse positions. The spring includes coils 93 with the lever arm 94 at the labial side and the tail 95 at the lingual side. The pin 92 includes a tail 96 with a head 97 at the upper end and a locking tab 98 extends therefrom and is bent beneath the coils 93. The locking tab 98 is identical to the tab 56 in the embodiment of FIG. 9 in that it has a bifurcated end for receiving the spring tail. The pin 92 is identical to the pin 53 with the exception that it is turned 180 degrees so that the tail 96 inserts in the labial side of the pin opening. Further, the uprighting spring tail 95 inserts in the lingual side of the pin opening, and as in the other embodiments, the arch wire is captured between the spring and pin tails.

A further embodiment of the lock spring pin appliance of the invention is shown in FIGS. 16–18, wherein the appliance is generally designated by the numeral 110 and includes an uprighting spring 111 and a pin 112. The appliance here is also illustrated for use with a standard light wire bracket of the type illustrated in the previous embodiments although it should be appreciated that this appliance can be used for other light wire brackets, for example, the Unipoint bracket made by Unitek Corporation. This appliance differs from the previous embodiments primarily in that the pin tail is shortened, while the spring tail is lengthened to enable the spring tail to be bent over the end of the bracket for locking the appliance in place. While reference has been heretofore made to the possibility of locking more than one arch wire in the arch wire slot of a bracket, for purposes of illustration, this embodiment of the spring pin appliance shows locking an auxiliary arch wire 113 in the arch wire slot with the main arch wire 15.

Except for the length of the spring tail, the spring 111 is otherwise identical in construction to the spring 10 shown in previous embodiments and that includes a plurality of connected coils 115. One end of the coils is integral with the tail 116, while the other end is integral with a lever arm 117 which terminates in a hook 118. The length of the spring tail 116 is such that when the appliance is mounted in the bracket, as shown in FIG. 17, the tail extends through the pin opening and beyond the end of the bracket so that it may be bent around the end of the bracket, as shown in FIG. 18. As already mentioned, while it is possible to bend the spring tail, since the spring is made of spring steel, it is extremely difficult to bend unless it has been annealed or softened. Accordingly, it is to be understood that normally the end portion of the spring tail, which will be subjected to rather sharp bending, will be preannealed prior to insertion in the bracket and locking of the appliance to the bracket. Pre-annealing can be accomplished in any suitable manner, such as by properly heating the end of the spring tail with any suitable heat source.

The pin 112 includes a stem or tail 125 adapted to be received between the welding flanges of the bracket and a head 126 extending generally perpendicular to the tail and beneath the coils 115 of the spring. A hole 127 is provided in the pin head 126 to receive the tail of the spring and which coacts with a locking tab 128 that is bent back from the end of the head through the center of the spring coils to lock the spring and pin together as a unit and facilitate its handling when mounting same on a bracket. Except for the fact that the tail 125 is relatively short so that it will only extend along and lingually of the arch wire or wires, the pin 112 is generally of the same construction as the pin 21 illustrated in FIG. 3. As shown in FIG. 17, the pin tail 125 is of a length equal to about the depth of the arch wires or the depth of the arch wire slot to assist the straddling of the arch wire with the spring tail 116. Essentially, the pin tail coacts with the arch wire slot 28 and the pin head to contain the arch wires with respect to the bracket because the pin tail extends down along the lingual side of the arch wires, there is no possibility that the arch wires can escape from the bracket.

While the embodiment of FIGS. 16 to 18 illustrates the placement of the pin tail lingual to the arch wires and the spring tail labial to the arch wires, it may be recognized the spring tail may be positioned lingual of the arch wires and the pin tail positioned labial of the arch wires such as illustrated in the embodiment of FIG. 15. As in the other embodiments, the pin and spring tails essentially straddle the arch wires to assist in providing positive locking of the arch wires to the bracket.

Although only the pin tail or the spring tail in the embodiments illustrated extend beyond the bracket to be bent over and lock the appliance in place, it should be appreciated that both tails could be of such length to extend beyond the bracket to be bent over and provide more secure anchoring of the appliance to the bracket.

It will be understood that modifications and variations may be effected without departing from the scope of the novel concepts of the present invention, but it is understood that this application is to be limited only by the scope of the appended claims.

The invention is hereby claimed as follows:

1. A lock spring pin appliance in combination with a bracket of the type having a body with occlusogingivally extending opening means and a mesiodistally extending arch wire slot to lock one or more arch wires in the slot and apply an uprighting force to the bracket and tooth to which the bracket is attached, said appliance comprising an uprighting spring and a pin, said spring being of spring steel and including a plurality of coils, a tail extending from the coils into said opening means, and a lever arm extending from the coils connecting at one side of the bracket to an arch wire locked in the slot, said pin including a head overlying said arch wire slot, and a tail extending from the head into the opening means, one of the tails extending along the lingual side of the arch wire slot and the other of the tails extending along the labial side of the slot, thereby positioning the arch wire between the tails, and one of said tails being of such a length as to extend through the opening means and be bendable back on the bracket to lock the appliance to the bracket, and the other tail being of a length at least equal to the occlusogingival depth of the slot.

2. The appliance as defined in claim 1, wherein means on the pin locks the spring and pin together prior to mounting on a bracket.

3. The appliance as defined in claim 1, wherein the head of the pin seats on the bracket.

4. The appliance as defined in claim 1, wherein the head of the pin is arranged between the spring coils and the bracket.

5. The appliance as defined in claim 1, wherein a lock tab extends from the head of the pin back into the center of the coils to lock the spring and pin together prior to mounting the appliance on a bracket.

6. The appliance as defined in claim 1, wherein the head of the pin extends through the coils of the spring.

7. The appliance as defined in claim 6, wherein means extends from the head of the pin coacting therewith to lock the spring and pin together prior to mounting the appliance on a bracket.

8. The appliance as defined in claim 1, and means extending laterally from said head to engage the arch wire following a predetermined tipping movement and limiting the tipping action of the spring.

9. The appliance as defined in claim 4, and a hole is provided in the pin head through which the tail of the spring extends.

10. The appliance as defined in claim 9, and means extending from the head of the pin coacting therewith to lock the pin and spring together prior to mounting the appliance on a bracket.

11. The appliance as defined in claim 10, wherein said means extending from the head includes a lock tab which extends into the center of the spring coils.

12. The appliance as defined in claim 9, and extensions extending from the head of the pin and along the mesial and distal sides of the bracket body to prevent relative rotation between the appliance and the bracket.

13. The appliance as defined in claim 11, and means extending laterally from said head to engage the arch wire following a predetermined tipping movement and limiting the tipping action of the spring.

14. The appliance as defined in claim 1, wherein the length of the spring tail is such that it will not exceed the occlusogingival length of the bracket, and the pin is made of an easily bendable metal and of such a length that is greater than the occlusogingival length of the bracket and can be bent over the bracket to lock the appliance thereto.

15. The appliance as defined in claim 1, wherein the spring tail is on the labial side of the arch wire slot and the pin tail is on the lingual side thereof.

16. The appliance as defined in claim 1, wherein the spring tail is on the lingual side of the arch wire slot and the pin tail is on the labial side thereof.

17. The appliance as defined in claim 1, wherein the pin tail is of such a length to be bendable over the bracket and lock the appliance thereto.

18. The appliance as defined in claim 1, wherein the spring tail is of such a length to be bendable over the bracket and lock the appliance thereto.

19. A lock spring pin appliance in combination with a bracket of the type having a body with an occlusogingivally extending pin opening and a mesiodistally extending arch wire slot to lock one or more arch wires in the slot and apply an uprighting force to the bracket and tooth to which the bracket is attached, said appliance comprising an uprighting spring and a pin, said spring being of spring steel and including a plurality of coils, a tail extending from the coils into the pin opening along one side of said arch wire and terminating beyond the bracket so it can be bent back on the bracket for anchoring the appliance to the bracket, and a lever arm extending from the coils connecting at one side of the bracket to an arch wire locked in the slot to generate a working force between the arch wire and the bracket, said pin including a head overlying said arch wire slot to close same and against which the spring coils seat, and a tail extending from the head into the pin opening along the other side of said arch wire.

20. The appliance as defined in claim 19, and a hole in said pin head through which the tail of the spring extends.

21. The appliance as defined in claim 20, and means extending from the pin head coacting therewith to lock the spring and pin together prior to mounting the appliance on a bracket.

22. The appliance as defined in claim 21, wherein said means extending from the pin head includes a locking tab extending into the center of the coils.

23. The appliance as defined in claim 22, wherein the occlusogingival length of the pin tail is about the same as the occlusogingival depth of the arch wire slot.

24. A lock spring pin appliance in combination with a bracket of the type having a body with an occlusogingivally extending pin opening and a mesiodistally extending arch wire slot, said appliance locking one or more arch wires in the slot and applying an uprighting force to the bracket and tooth to which the bracket is attached, said appliance comprising an uprighting spring and a pin, said pin being of easily bendable metal having a tail extendable through and terminating beyond the pin opening and a head at one end thereof extending substantially perpendicular to the tail and seating against the slot end of the bracket body and overlying the slot to lock the arch wire therein, and a hole in the head aligned with the pin opening, and an uprighting spring of spring steel wire including coil means having a tail and a lever arm extending therefrom, the tail extending through the head hole into the pin opening so that the coil means seats on the head, means extending from the head and coacting therewith to fasten the pin and spring together prior to mounting the appliance on a bracket, and the lever arm terminating in a hook connecting to the arch wire at one side of the bracket to generate a working force between the arch wire and the bracket.

25. The appliance as defined in claim 24, and means extending laterally from said pin head to engage the arch wire following a predetermined tipping movement and stopping the tipping action of the spring.

26. The appliance as defined in claim 24, wherein the spring tail is labial to the arch wire and the pin tail is lingual to the arch wire.

27. A spring pin appliance in combination with a bracket of the type having a body with an occlusogingivally extending opening to lock one or more arch wires to the bracket and apply an uprighting force to the bracket, said appliance comprising an uprighting spring and a pin, said spring including a plurality of coils, a tail extending from the coils to engage the bracket body and hold one end of the coils, and a lever arm extending from the coils including a hook portion engaging an arch wire locked to the bracket at one side of the bracket, said pin including a head and a tail, said spring tail and pin head coacting to interconnect the spring and pin together, and said pin tail extending into the opening and beyond the bracket so it may be bent over the bracket to lock the appliance thereto.

28. A spring pin appliance in combination with a bracket of the type having a body with an occlusogingivally extending opening to lock one or more arch wires to the bracket and apply an uprighting force to the bracket, said appliance comrpising an uprighting spring and a pin, said spring including a plurality of coils, a tail extending from the coils into said opening to hold one end of the coils, and a lever arm extending from the coils including a hook portion engaging an arch wire locked to the bracket at one side of the bracket, said pin including a head and a tail, said spring tail and pin head coacting to interconnect the spring and pin together, said pin tail extending into the opening and coacting with the pin head and spring tail to straddle the arch wire and lock same to the bracket, and at least one of said tails extending beyond the bracket so it may be bent over the bracket to lock the appliance thereto.

* * * * *

UNITED STATES PATENT OFFICE
CERTIFICATE OF CORRECTION

Patent No. 3,793,730   Dated February 26, 1974

Inventor(s) Percy R. Begg and Peter C. Kesling

It is certified that error appears in the above-identified patent and that said Letters Patent are hereby corrected as shown below:

```
Col. 2, line 32, change '"ore-moved"' to --"over-moved"--;
Col. 3, line 56, change "tap" to --tab--;
Col. 4, line 6,  change "elevation" to --elevational--;
Col. 5, line 65, change "beyong" to --beyond--;
Col. 6, line 25, change "than" to --then--;
Col. 7, line 2,  change "ends" to --sides--;
        line 12, after "bent" insert --back--; and
Col. 8, line 28, change "ppurposes" to --purposes--.
```

Signed and sealed this 17th day of September 1974.

(SEAL)
Attest:

McCOY M. GIBSON JR.
Attesting Officer

C. MARSHALL DANN
Commissioner of Patents